March 18, 1941.   E. M. BOUTON ET AL   2,235,395
QUOTA CONTROL SYSTEM
Filed Nov. 29, 1939   7 Sheets-Sheet 1
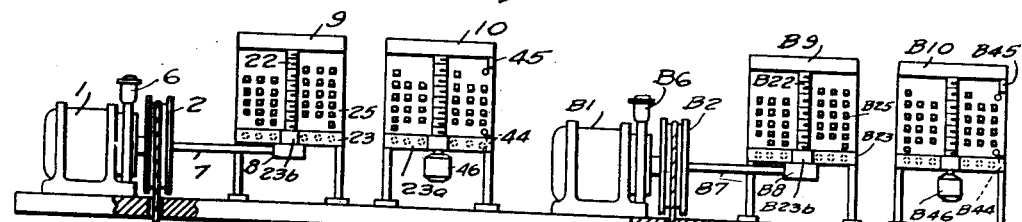
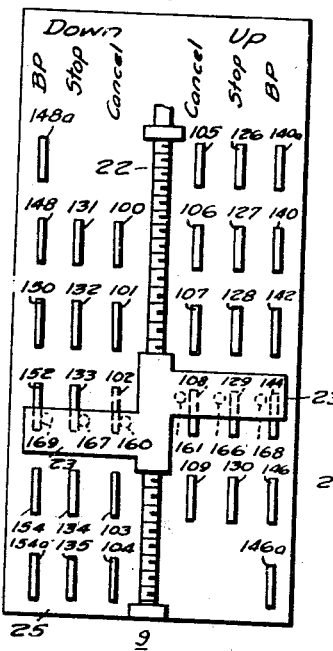
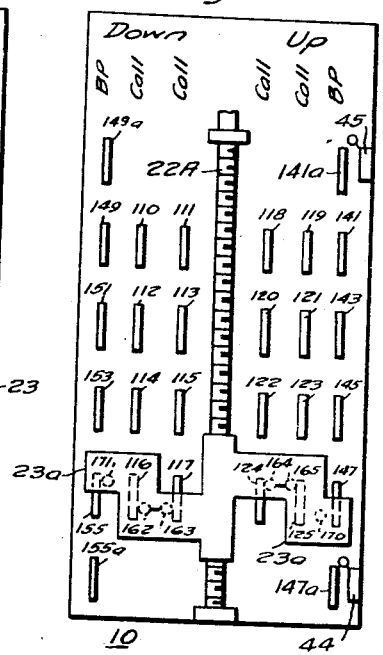
INVENTORS
Edgar M. Bouton, Harold W. Williams
and Danilo Santini.
ATTORNEY March 18, 1941.　　　E. M. BOUTON ET AL　　　2,235,395
QUOTA CONTROL SYSTEM
Filed Nov. 29, 1939　　　7 Sheets-Sheet 2

WITNESSES:

INVENTORS
Edgar M. Bouton, Harold W. Williams
and Danilo Santini.
BY
ATTORNEY

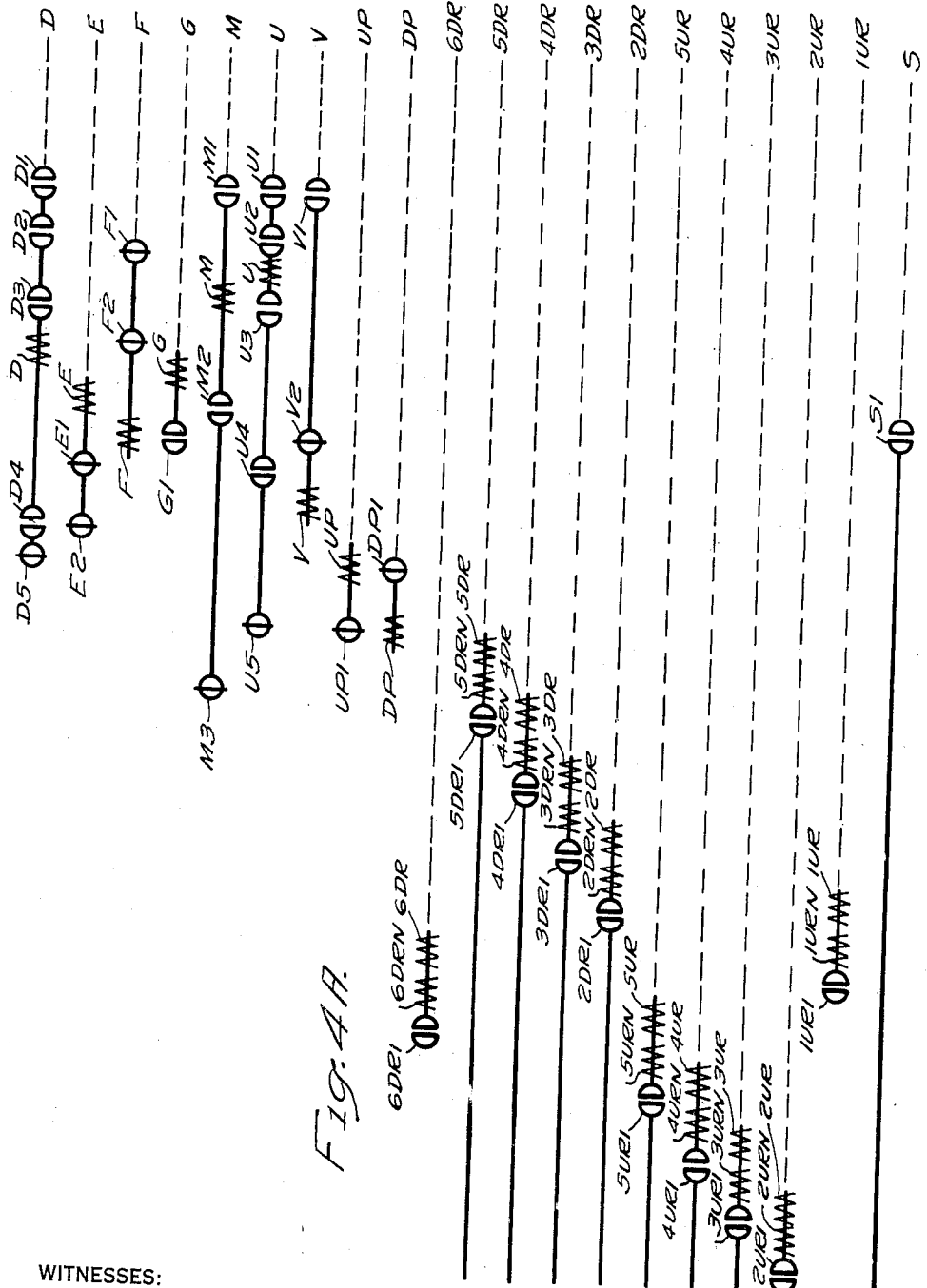

Patented Mar. 18, 1941

2,235,395

UNITED STATES PATENT OFFICE 2,235,395

QUOTA CONTROL SYSTEM

Edgar M. Bouton, Nutley, Danilo Santini, Tenafly, and Harold W. Williams, Jersey City, N. J., assignors to Westinghouse Electric Elevator Company, Jersey City, N. J., a corporation of Illinois Application November 29, 1939, Serial No. 306,706

12 Claims. (Cl. 187—29)

Our invention relates generally to control systems for groups of elevators operating as a unit and more specifically to systems for regulating the movements of elevator cars in a bank where the cars automatically respond to registered calls at the floors served.

The object of our invention generally stated is to provide a control system for a group of cars by means of which the most efficient handling of traffic can be accomplished and which will result in service most satisfactory to the passengers.

One object is to prevent the stopping of an elevator car by a floor call of short duration when the car is behind its desired position in the sequence of movement.

Another object is to enable each of the cars of the bank to maintain its desired position regardless of irregularity in the rate of registering elevator calls for service.

A further object is to favor calls whose registrations are of the longest duration, in the response by the various cars of a bank.

A still further object is to reduce the traveling time of passengers who board an elevator at the upper building floors until they arrive at their destination, usually the first floor of the building.

Another object of our invention is to provide a novel means of dividing an elevator shaft into zones of continually varying extent, independent of car position, and assigning a particular zone to a given car, such that a call registered in that zone will be answered by the associated car.

Other objects of our invention will, in part, be obvious and will, in part, appear hereinafter.

One embodiment of our invention is disclosed in the accompanying drawings and comprises the features of construction, combination of elements and arrangement of parts which will be exemplified in the constructions hereinafter set forth. The scope of the application will be indicated in the appended claims.

For a more complete understanding of the nature and scope of our invention, reference may be had to the following detailed description taken in connection with the accompanying drawings, in which:

Figure 1 illustrates an arrangement of two cars of a bank of elevators;

Figs. 2 and 3 illustrate enlarged views of the signal floor selector and the pick-up floor selector for the car illustrated in Fig. 1;

Figure 4:
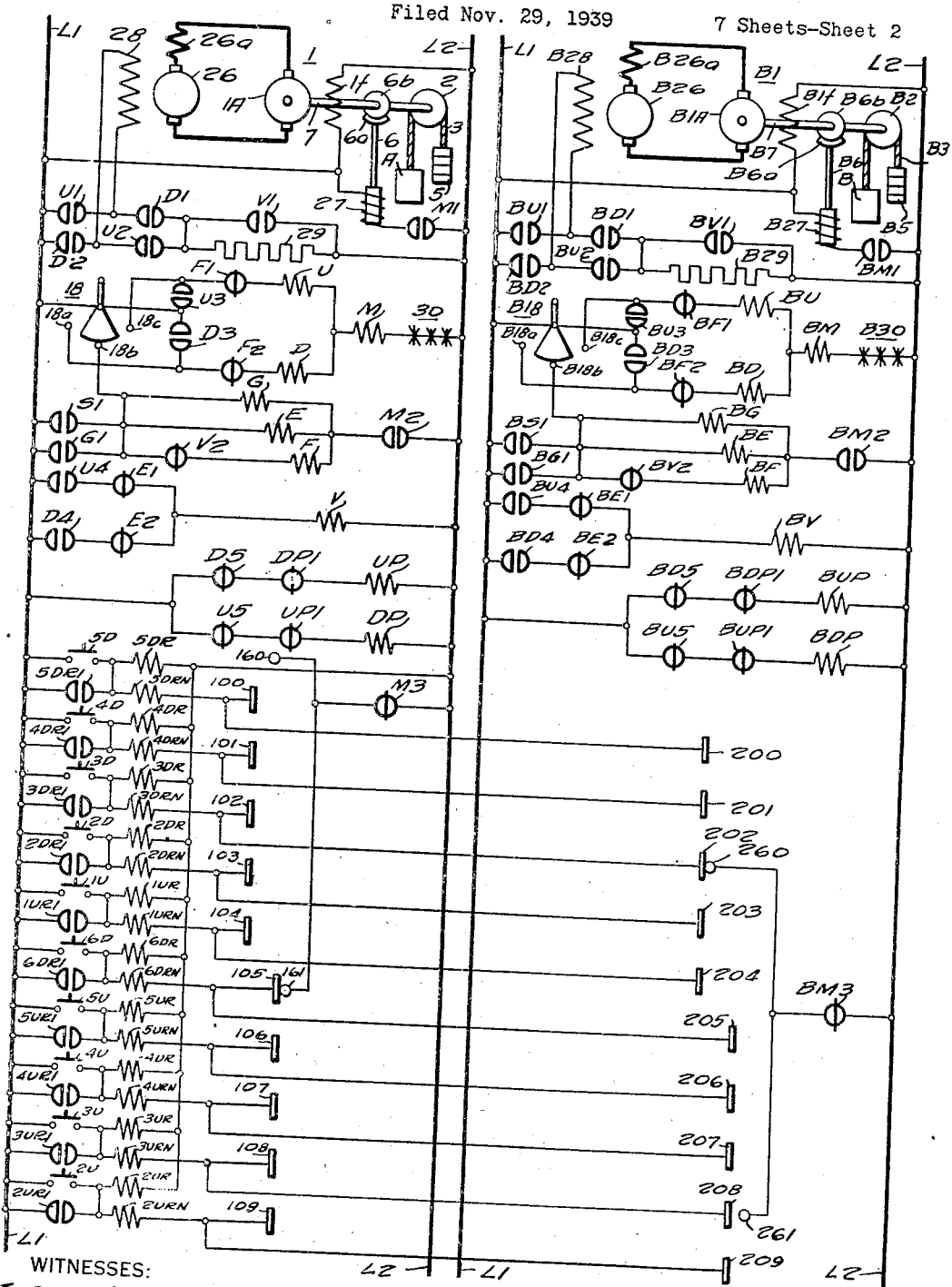
Figure 5:
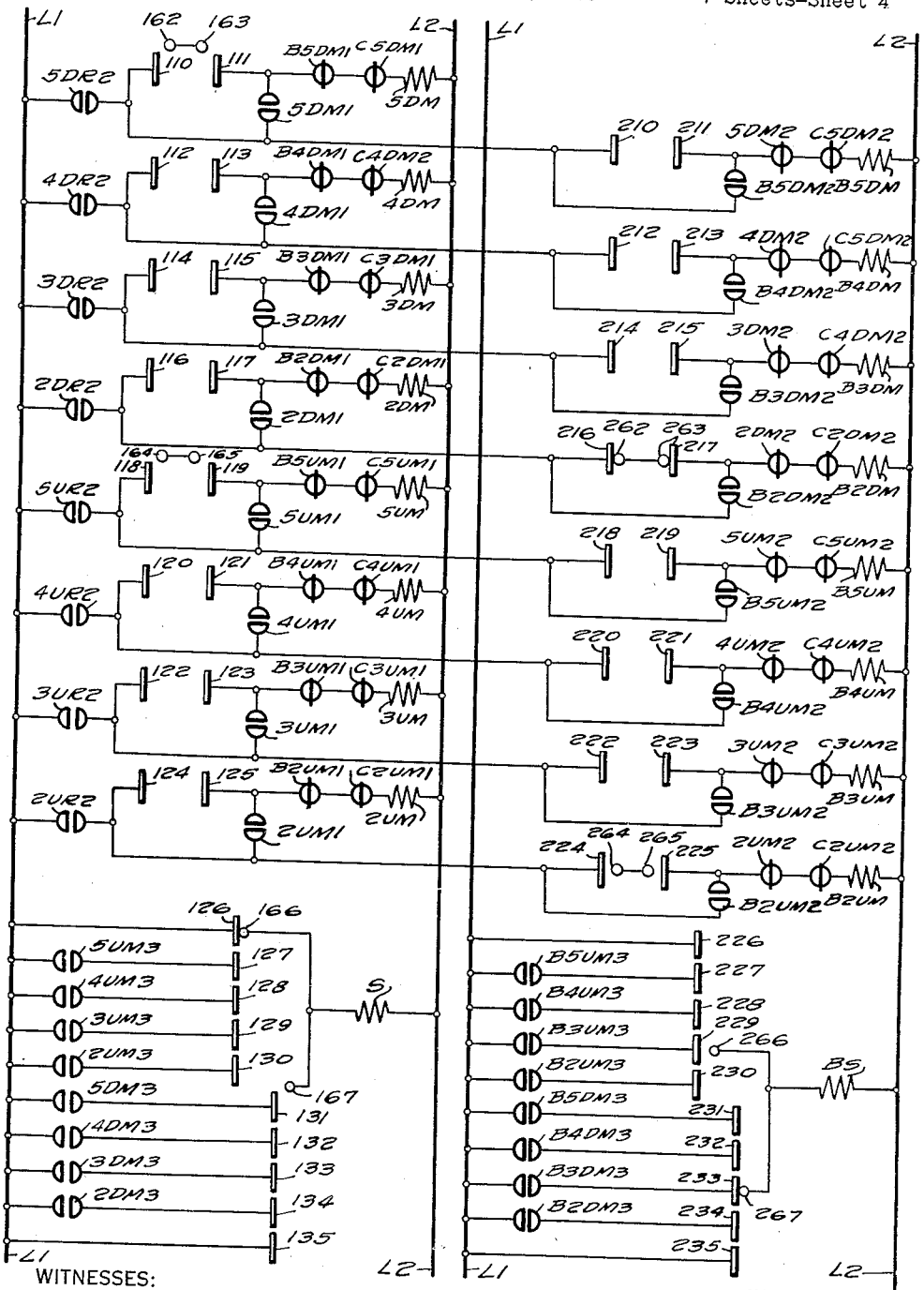
Figure 5A:
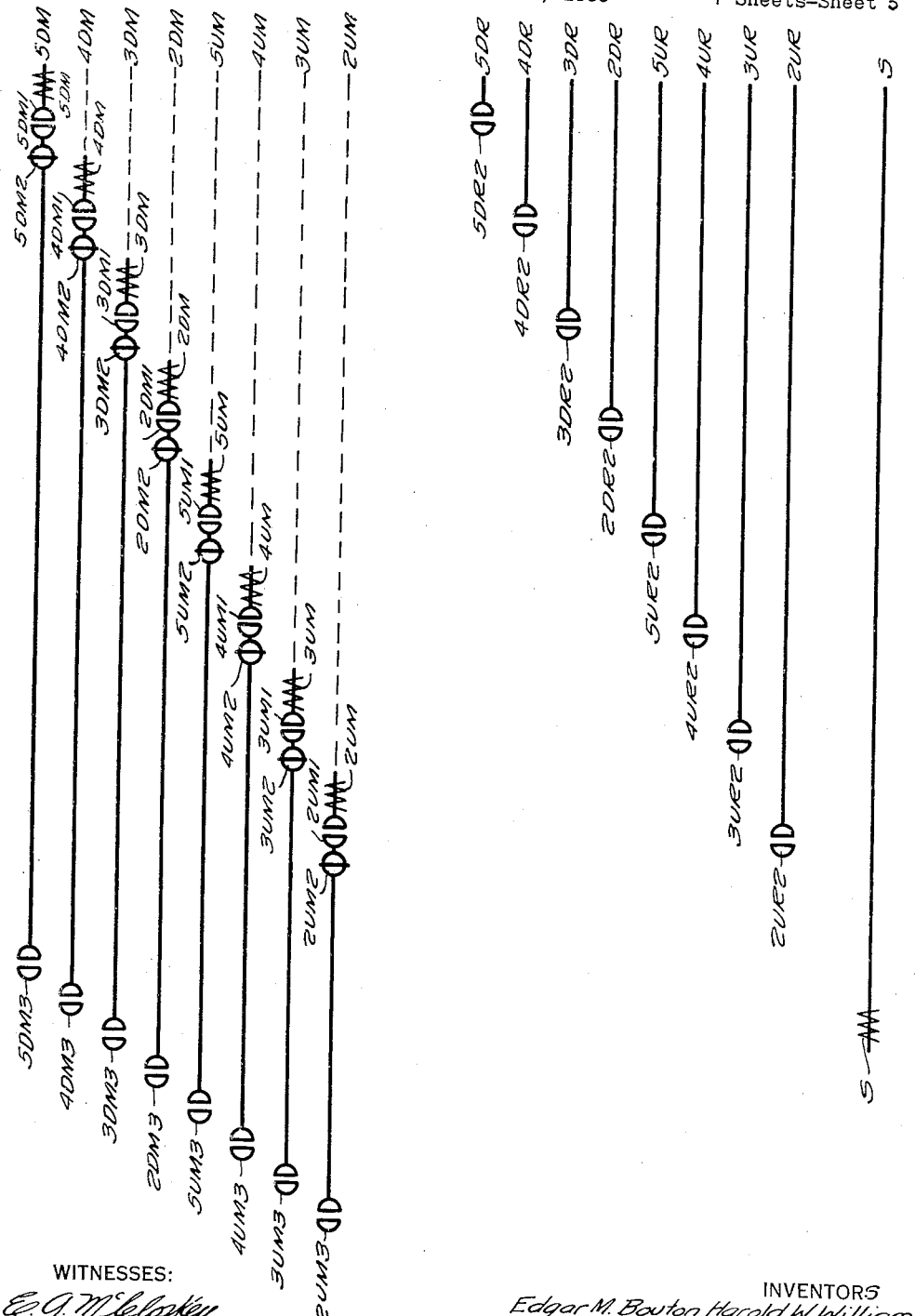
Figure 6:
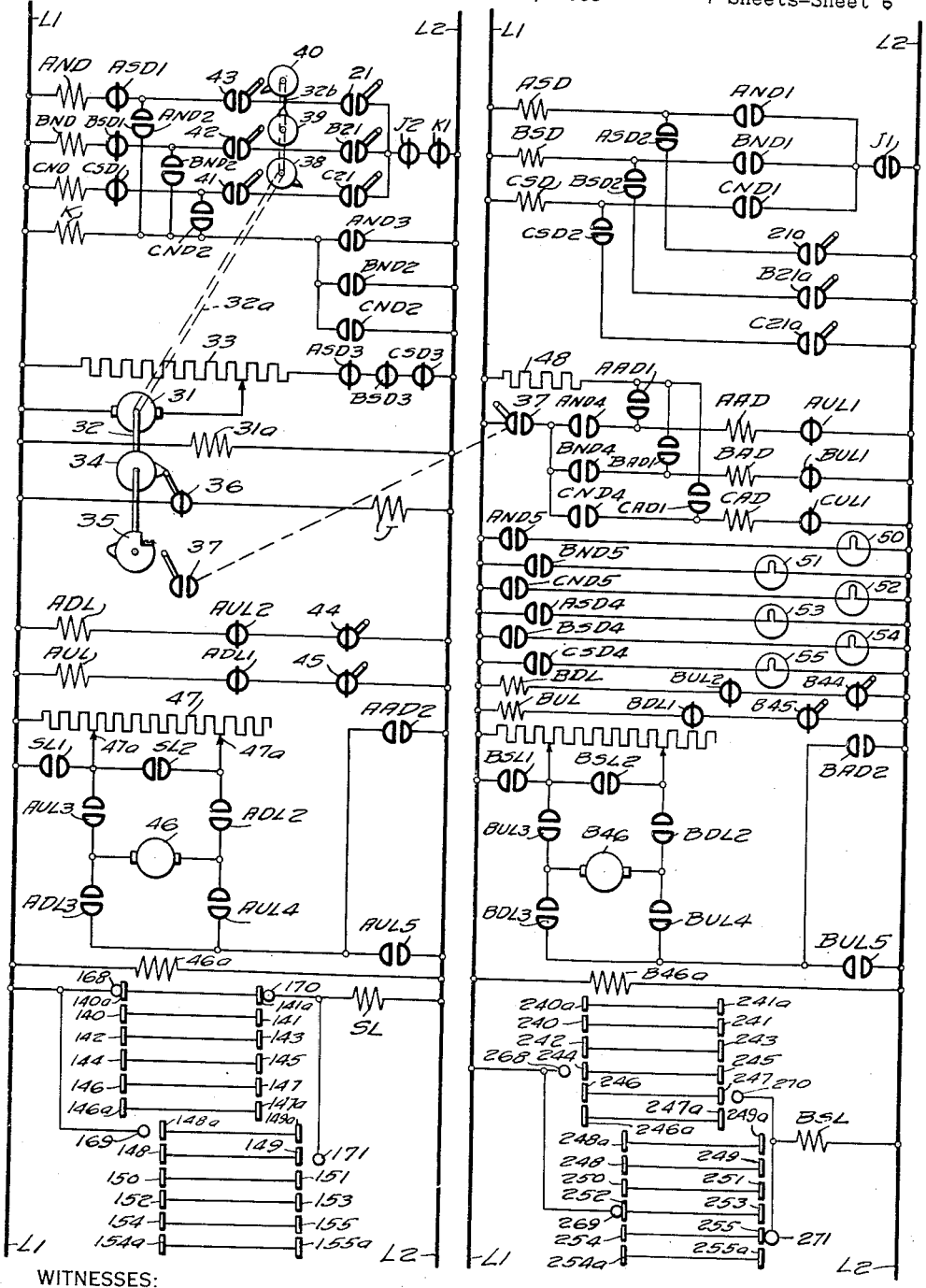
Figure 6A:
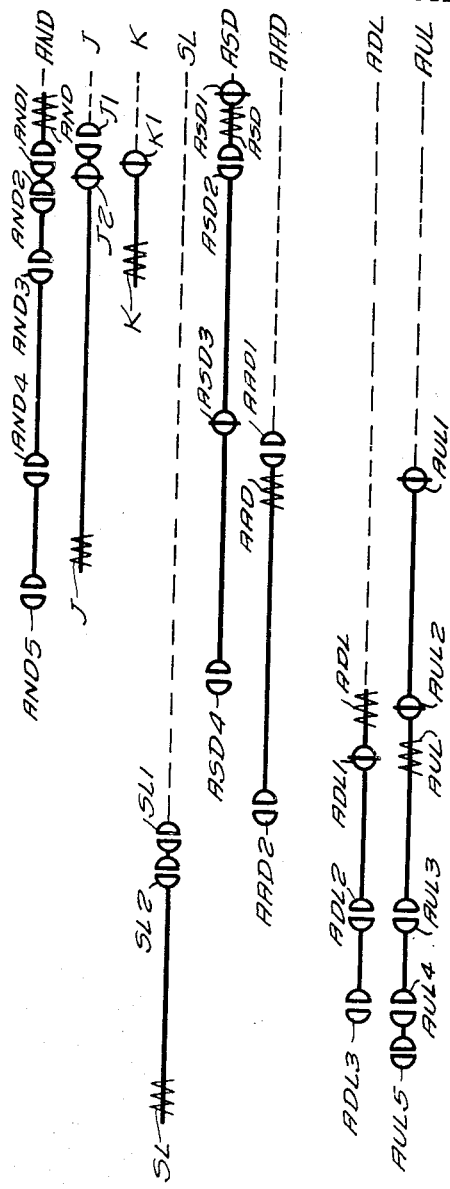

Figs. 4, 5 and 6, collectively, illustrate diagrammatically in straight-line style the electrical connections for two cars of a bank of elevators operating in accordance with our invention; and Figs. 4A, 5A and 6A illustrate the physical arrangement of the coils and contacts shown in Figs. 4, 5 and 6, respectively.

It will be observed that Figs. 4, 5 and 6 can be arranged one under another to form a complete elevator wiring diagram of the straight line type. Relay and contactor coils are shown where convenient without reference to their actual position on a panel. The contacts operated by these coils are illustrated without reference to the location of the coil.

Figs. 4A, 5A and 6A may now be arranged adjacent to Figs. 4, 5 and 6 and will form a key for associating physically the contacts of Figs. 4, 5 and 6 with the coils shown in these figures. A straight edge laid horizontally on the assembled figures will be found to direct the eye to a given coil both in Fig. 4 and 4A, for instance. A contact operated by this coil appearing along the vertical line of the relay of Fig. 4A may be located in Fig. 4 by the use of the straight edge in a similar manner.

To conserve drawings the relays and contacts of car B, of Figs. 4, 5 and 6 have not been shown on Figs. 4A, 5A and 6A, because the coils and contacts for car B have the same relative location as those for car A. Therefore, the key to the contacts and coils for car A may be used to locate the contacts and coils for car B. Similar parts are similarly marked except that those for car B carry a prefixed letter B.

Many contacts may be operated by one coil. The contacts of each relay are differentiated numerically as their position progresses down the assembled diagram. It is believed that the numbering system will be evident from a study of the drawings.

To assist in identifying the various relays illustrated in the diagram the following table lists the identifying letters and the primary function performed by the relay.

*Individual to each car*

U—Up direction switch
D—Down direction switch
M—Brake release relay
G—Inductor energizing relay
E—High speed inductor relay coil
F—Slow speed inductor relay coil
V—High speed control relay
UP—Up direction preference relay
DP—Down direction preference relay
S—Call pick-up relay
2UM to 5UM—Up call storing relay
2DM to 5DM—Down call storing relay
AND—Dispatcher "next"
AAD—Pick-up selector control
ASD—Dispatcher "start"
J—Dispatch signal relay
K—Dispatch auxiliary relay
SL—Speed control relay for pick-up selector
ADL—Down direction relay for pick-up selector
AUL—Up direction relay for pick-up selector

*Common to all cars*

1UR to 5UR—Up call storing relay (common to all cars)

2DR to 6DR—Down call storing relay (common to all cars)

Referring more particularly to Figure 1, we have illustrated an elevator installation for two cars A and B. The cars are similar in construction and only car A is shown in Fig. 1, although the driving mechanism for both cars is shown. Obviously, the system may be arranged for any number of cars desired.

A driving motor 1, in response to power supplied through a controller (not shown), drives through sheave 2 and a cable 3, the car A in a well known manner. The car A is counterbalanced by a weight 5 on the free end of cable 3. Motor 1 is provided with a brake 6 to hold its shaft 7 from turning when the brake is applied. Shaft 7 drives through suitable gearing 8, a signal floor selector 9, a stationary element, and a moving element to be described later.

Car A operates past a plurality of floors. To assist in stopping the car at the floors a plurality of plates 11, 11a, 12 and 13 are mounted in the shaftway of the elevator. One set is associated with each floor. Only one set is illustrated. Plates 11 and 11a are operably associated with a stopping inductor switch F carried by the car and plates 12 and 13 are operably associated with a decelerating inductor switch E. The operation of these will be described later. Each car has provided at each floor an up-direction signal lamp 14 and a down-direction signal lamp 15 to indicate the direction of car travel. An up pushbutton and a down pushbutton common to both cars are mounted at each floor for causing the cars to stop thereat. The up button at the third floor is marked 3U and the down button as 3D. The buttons at the other floors are similarly marked, except that no buttons are shown for the terminal floors.

The car A is provided with a starting switch 18 which may be moved to start the car. Each car is provided with a cam 19 operably engaging a pair of rollers to close a pair of switches 21 and 21a, when the car is stopped at one of the floors, preferably the upper terminal floor, from which the cars are started in a down direction in a manner to be described.

Each car is provided with two floor selectors, one called its signal floor selector and the other called its call pick-up floor selector.

The signal floor selector is operated by the car operating mechanism in accordance with the movement of the car.

The call pick-up selector is operated by an independent motor which moves it at a constant rate of speed normally a predetermined distance ahead of the car. If the car gets to running at a speed which causes it to overtake the pick-up selector, certain electrical connections result which cause the pick-up selector to run faster and thereby keep near its normal predetermined distance ahead of the car. When the car makes a stop, its signal selector stops but its pick-up selector keeps moving along at its constant predetermined speed. Hence, it will be apparent that the distance between the signal selector position and the pick-up selector will vary at times from the selected predetermined distance but that the pick-up selector will always be in the lead.

The duty of the pick-up selector is to pick up registered floor stop calls in a predetermined zone in advance of its car and reserve them for that car. This predetermined zone may start two, three or four or even more floors ahead of the normal position of the car. If the car falls behind its normal running schedule, the zone may be ahead several floors more than the selected predetermined distance. At other times the car may run so fast that it will almost catch up to the pick-up selector so that the pick-up selector will be only one or two floors ahead of the car. The stop calls registered at the floors between the pick-up selector and the car will be taken up by the pick-up selector of the next following car and assigned to that car.

The signal selector of car A is given the number 9 and its pick-up selector is given the number 10. The selectors for the other cars will be given the same numerals with the prefix letters accorded to the cars.

The signal selector 9 for car A comprises a screw shaft 22 (Fig. 2) and a movable cross-head member 23 mounted thereon to be driven up and down by a nut 23b operated by rotation of the shaft. Cross-head 23 carries a plurality of moving brushes or contact members arranged to engage stationary contact segments on a stationary element or base 25 to make and break electrical circuits as will be described more in detail later. (The brushes and contact segments are given individual numerals later.) In addition, cross-head 23 has a degree of rotary motion permitted such that the friction of the nut on the screw shaft rotates the cross-head to make the up brushes 24 move out of engagement with the down stationary contacts when the car is going up and reverse the operation when the car is going down. This construction is well known in the elevator art and it is believed does not require more detailed explanation.

In the enlarged view of the signal selector 9 shown in Fig. 2, the cross-head 23 is shown at the position it occupies when its car A is located at the third floor. As the car moves up and down, cross-head 23 will move into a similar position for each floor served by the car through the turning of shaft 22. In this view the moving contact brushes are identified by individual numbers 160, 167, and 169, which correspond to numbers assigned in Figs. 4, 5 and 6. These members are shown in the position they occupy for down car motion contacting stationary contacts 102, 133 and 152, respectively. Moving contact members 161, 166 and 168 are shown out of contact with their associated stationary members 108, 129 and 144.

Fig. 3 shows a similar view of the pick-up selector 10 for car A used in our invention. One of these is associated with each additional car which may be used in the system. Its operation is identical to that of the signal selector except that its shaft 22A is driven by an individual small motor 46 in a manner to be described later.

Fig. 4 illustrates the motor control circuits for the two cars A and B, together with the call registering circuits for the bank of cars. Although these circuits are arranged for a building of six floors, they may be arranged for any desired number of floors. The drive for the motor 1 is illustrated as the well known variable voltage drive. Any other form of motor drive can be used equally well. In this system, generator armature 26 is shown as connected in loop circuit with motor armature 1A. Motor field is illustrated as continuously energized by current from supply lines L1 and L2. Brake 6 is illustrated as a shoe 6a, engaging a brake sheave 6b under pressure from springs, not shown. Brake coil 27, when energized, compresses the springs and moves shoe 6a, out of engagement with sheave 6b.

A series winding 26a is provided for the generator armature 26 to provide voltage regulation for varying the motor current. A separately excited field 28 is provided for the armature 26. Field 28 is under control of an up direction relay U and a down direction relay D, which reverses its direction for up and down car motion, and a speed relay V which, by shorting series resistor 29 provides high car speed and which, by inserting resistor 29, provides a low landing speed for the car. Relay M controls the energization of brake coil 27. Connections for inductor coils E and F in conjunction with relay G, will be described later as will direction preference relay circuits of relays UP and DP.

Fig. 5 shows circuits for appropriating floor calls to an individual car through connections to a series of relays marked 5DM to 2DM for down and 5UM to 2UM for up motion. A relay S serves to initiate slow down when a floor is approached at which a registered call has been appropriated. These circuits will be described later.

Fig. 6 shows circuits for dispatching the cars of the bank from a dispatching floor, preferably the top terminal. A timing motor armature 31 drives a shaft 32 at adjustable speeds, depending on the amount of resistor 33 included in its circuit. Timing motor field 31a is connected for continuous energization to the supply conductors L1 and L2. Shaft 32 may be geared to motor 31 to obtain a low speed of rotation. This speed should be equal to one revolution in the number of seconds that should elapse between successive cars leaving the top terminal (the dispatching floor). Shaft 32 drives a plurality of cam members 34 and 35. Cam 35 is angularly adjustable with respect to cam 34. Cam 34 closes a switch member 36 once each revolution to energize relay coil J, as will be described later. Cam 35 also closes a switch member 37 for a purpose to be described.

A second shaft 32a is driven by motor 31, preferably through a gear reduction to give a speed rotation of one revolution in about 2 to 6 seconds. Shaft 32a drives a plurality of cam members 38, 39 and 40 set at angular positions to close a plurality of switch members 41, 42 and 43 in sequence for a purpose which will be described later.

Two normally closed switch members 44 and 45 are provided in pick-up selector 10 (Fig. 3). Switch member 45 is opened by traveling member 23a, at the extreme top of its travel and switch member 44 is similarly opened at the extreme bottom of the travel of member 23a. These switch members control circuits to relay coils AUL and ADL (Fig. 6) for a purpose to be described later.

A relay AAD is provided for starting the pick up selector of car A away from the terminal floor when the car is given a "next" signal.

Motor armature 46 drives shaft 22A of the pick-up selector 10 of Fig. 3. Field 46a is connected for continuous energization to supply lines L1 and L2. The normal predetermined speed of the motor 46 may be changed by changing the amount of resistance 47 connected in circuit. The direction of rotation of motor 46 is determined by contacts of relays AUL and ADL as will be described later.

Fig. 6 shows connections to coils of a series of relays AND, BND, and CND. These relays control "next" signal lamps 50, 51 and 52 in the associated cars A, B and C to advise the operators to prepare to start to be accompanied by an action such as opening the car doors to receive passengers, or other action desirable in the proper handling of traffic. A second series of relays, ASD, BSD, and CSD control "start" signal lamps 53, 54 and 55, also in the associated cars. The "start" signal lamps advise the operators when to close their doors to start a round trip. The operation of these relays and, therefore, the movements of the cars is controlled by timing motor 31. This operation as well as that of other parts of the diagram not specifically described will be best understood by an assumed operation of the system.

An assumed operation of the system is as follows:

It will be assumed that the supply conductors L1 and L2 are connected to a suitable source of electric energy, thus energizing the hoisting motor field winding 1f, the field winding 31a of the timing motor 31 and the field windings 46a and B46a of the pick up selector motors.

Assuming car A stopped at a floor with its door open and it is desired to move in the up direction. When the doors are closed the associated door interlock 30 (Fig. 4) is closed and the movement of the car is determined by master switch 18. We also contemplate using our system with cars started automatically in response to the operation of circuit closing devices not on the car and the system shown is merely illustrative. Moving the car starting switch 18 to close a circuit to contact 18c closes a circuit to direction switch U and brake switch M.

L1—18c—F1—coil U—coil M—30—L2 (Fig. 4)

A self-holding circuit prevents interruption of the circuit through the coils in the event that switch 18 is centered.

L1—U3—F1—coil U—coil M—30—L2 (Fig. 4)

Brake coil 27 becomes energized through contact M1 closing.

L1—27—M1—L2

Voltage is produced on generator armature 26 by field coil 28 being energized.

L1—U1—28—U2—29—L2 (Fig. 4)

The car starts to move in the up direction at slow speed, as the voltage is limited by resistor 29. Speed switch V becomes energized through contact U4 closing L1—U4—E1—coil V—L2 (Fig. 4)

The elevator now accelerates to its full speed in the up direction. The car may be slowed down and stopped at a floor in the following manner which again is merely illustrative of several methods. Stops may be initiated by floor pushbuttons or in any well known manner. However, in this case it will be assumed that the operator stops the car by centering the car switch in a zone in advance of the desired floor. A circuit is now set up to energize coils G and E.

L1—18b—coils G and E in parallel—M2—L2 (Fig. 4)

A self-holding circuit prevents interruption by additional movement of switch 18.

L1—G1—coils G and E—M2—L2

Energizing coil E of the slow-down inductor on the car, prepares its contacts for operation when the inductor switch passes plates 12 or 13 associated with the floor at which it is desired to stop. The operation of these switches is well known in the art and should not require a discussion of the theory involved.

When, in this case, plate 12 (Fig. 1) passes, contacts E1 open, interrupting the circuit to speed switch V. This inserts resistor 29 in series with the generator field 28 and slow down is initiated a distance from the floor determined by the position of plate 12.

Contacts V2 close energizing inductor coil F

L1—G1—V2—F—M2—L2

When plate 11a (Fig. 1) passes inductor F, contact F1 opens, interrupting the holding circuit to coils U and M. Brake 6 is applied and the generator voltage drops to zero and the car comes to rest at floor level after a short drift through the brake.

Contact M2 in opening interrupts the holding circuit to coil G and coils G, F and E are deenergized. The car doors are opened and the car is then ready for further operation.

The car doors may be opened and closed automatically by the operation of any of the power door drives well known in the art.

The operation of the motor control circuits in response to the actuation of a floor button will now be described. Assume that a down call is registered at the second floor by the actuation of button 2D (Fig. 4). Relay 2DR is energized.

L1—2D—coil 2DR—L2 (Fig. 4)

A self-holding circuit holds the coil energized when button 2D opens.

L1—2DR1—coil 2DR—L2 (Fig. 4)

Contact 2DR2 energizes selector segment 116 of the pick-up selector of car A, and selector segment 216 of the pick-up selector of car B, etc. to L1.

Assume now that the pick-up selector brushes 162 and 163 of car A move into contact with selector segments 116 and 117 in response to downward movement of selector cross arm 23a (Fig. 3) a movement which will be described later.

A circuit is now set up to energize coil 2DM.

L1—2DR2—116—162—163—117—B2DM—
C2DM—coil 2DM—L2 (Fig. 5)

A self-holding circuit maintains the coil energized when selector contacts open.

L1—2DR2—2DM1—B2DM1—C2DM1—coil
2DM—L2 (Fig. 5)

Contact 2DM2 of relay 2DM opens a similar circuit to the coil B2DM of car B so that brushes 262 and 263 of its pickup selector connecting segments 216 and 217 will not close a similar circuit for car B until coil 2DM becomes deenergized.

Contact 2DM3 (Fig. 5) prepares a circuit to coil S by connecting selector segment 134 to L1. The previously traced movement of car A was up and we may assume the car at the upper terminal ready to start a down trip.

L1—D5—DP1—coil UP—L2

Assume now that the car is started down by contacting car starting contact 18a of car switch 18. Down circuits similar to the previously traced up circuits are set up and the car moves down at full speed. As the car approaches the second floor, its signal selector cross-head 23 (Fig. 2) moves in synchronism with it and, at a predetermined point in advance of the car arriving at the second floor, the signal selector brush 167 comes into contact with energized selector segment 134, closing a circuit to the stopping coil S L1, 2DM3—134—167—coil S—L2 (Fig. 5)

Relay G and inductor E are energized as in the previously described sequence. Relay V is deenergized by inductor E passing plate 13. The car is retarded and plate 11, passing energized inductor F, stops the car at the second floor. As the car comes to rest at the second floor coil 2DRN is energized through a circuit established by the signal selector brush 160 contacting segment 103 when the car and, therefore, the selector moving element is in the second floor position.

L1—2DR1—coil 2DRN—103—160—M3—L2
(Fig. 4)

Coil 2DRN is of such a value that it equals and opposes the energization of coil 2DR with the result that relay 2DR drops to the deenergized position. The opening of contact 2DR1 deenergizes both coils simultaneously. The opening of contact 2DR2 deenergizes coil 2DM, which drops its self-holding circuit and all circuits are returned to their original condition, ready for another operation.

The foregoing describes the sequence of response of an individual car to a floor call which was appropriated to it by brushes 162 and 163 of the pick-up selector moving into contact with segments 116 and 117. The moving element of the pick-up selector that carries these two brushes is driven by shaft 22A (Fig. 3) which, in turn, is driven by motor armature 46 (Fig. 6). This motor runs at a predetermined speed ahead of the car's position and appropriates calls to be answered later by the car. The car starts from the top terminal a short time after the moving element of the pick-up selector starts and, as it moves down the hatchway, it answers the calls that have been appropriated to it.

By this arrangement a car may stop at one of the top floors in response to a call and be somewhat delayed in starting again. It will, however, answer just the same calls as it would if it had not been delayed. This overcomes an objectionable fault in many elevator systems where a car once delayed has additional calls registered to which it must respond, which causes further delay until it has taken on a full load at floors in the upper portion of its travel and, therefore, cannot stop for calls at lower floors which may have been registered at lower floors in advance of the calls it was forced to answer. It will be evident that such a system tends to answer calls giving preference in the order of their registration.

The method of operating these call appropriating moving elements will now be described. We provide dispatching means for signalling the cars to start from the top terminal in an orderly sequence and at spaced intervals. The timer mechanism, driven by motor 31 previously described, initiates the timing impulses and selects the cars one at a time to respond. Inasmuch as the supply conductors L1 and L2 are energized, as previously described, the motor 31 is energized through circuit L1—31—33—ASD3—BSD3—CSD3—L2 (Fig. 6)

Inasmuch as car A is standing at the top floor, the relay coil SL is energized by the circuit L1—168—140a—141a—170—SL—L2 (Fig. 6)

and the relay coil ADL is energized by the circut

L1—coil ADL—AUL2—44—L2 (Fig. 6)

As motor 31 turns, shaft 32a rotates cams 38—39 and 40 to close switches 43, 41 and 42 in sequence. When switch 43 closes, a circuit will be set up to energize coil AND (assuming car A at the top floor having closed switches 21 and 21a by its cam 19 (Fig. 1).

L1—coil AND—ASD1—43—21—
      J2—K1—L2 (Fig. 6)

Relay AND closes a self-holding circuit

L1—coil AND—ASD1—
    AND2—AND3—L2 (Fig. 6)

Relay coil K becomes energized

L1—coil K—AND3—L2 (Fig. 6)

Contact K1 opening prevents any other pick-up circuit being closed while coil AND is energized.

The rotation of shaft 32 by motor 31 closes switch 37 and energizes coil AAD

L1—37—AND4—coil AAD—AUL1—L2 (Fig. 6)

Relay AAD closes a self-holding circuit

L1—48—AAD1—coil AAD—AUL1—L2 (Fig. 6)

Relay AAD also energizes the motor 46 of the pick-up selector for car A

L1—SL1—SL2—ADL2—46—
     ADL3—AAD2—L2 (Fig. 6)

By this operation of the relay AAD, caused by the closing of the switch 37, it is seen how the pick-up selector 10 for car A is started ahead of the car when the car is being given a "next" and later a "start" signal from the dispatching floor.

It should be noted here that when the pick-up selector 10 for car A arrived at the upper terminal (the dispatching floor), its arm 23a opened the switch 45 which deenergized its up direction relay AUL to open its contact members AUL1 thus deenergizing the relay AAD to open its contact members AAD2 and thus stop the motor 46. This means that the pick-up selector 10 for car A stops at the top floor and is not started away from that floor until car A is given a "next" signal to leave that floor. Also when car A arrived at the top floor, its signal selector arm 23 caught up with the stopped pick-up selector arm 23a. In this condition, the brush 168 on arm 23 engaged contact segment 140a on signal selector 9 and the brush 170 engaged the contact segment 141a on the pick-up selector 10 (lower part of Fig. 6), the speed control relay SL was energized, thereby closing its contacts SL1 and SL2 to prepare motor 46 for more rapid operation than its normal rate of speed. This is provided because the pick-up selector was stopped at the dispatching floor to await the dispatching therefrom of its car A.

It will also be obvious from this operation that if the signal selector 9 of car A catches up with the pick-up selector 10 at any time during the down or the up run of the car, the arrangement of the brushes 168 and 170 will cause relay SL to effect more rapid movement of arm 23a so that it will tend to keep a selected predetermined distance ahead. On the other hand, when the signal selector falls behind the pick-up selector, it will deenergize relay SL to insert the resistor 47 in the circuit of motor 46 and thus slow down the pick-up selector so that it will then run at the predetermined speed selected for it until halted at the dispatching floor for the next dispatching operation.

Returning now to the energization of motor 46 by the dispatching operation, the rotation of the motor 46 rotates its shaft 22A which, in turn, moves selector element 23a (Fig. 3) downward. Brushes 162 and 163, electrically connected, make contact successively with pairs of segments 110 and 111 to 116 and 117 (Figs. 3 and 5). When these brushes engage a pair of segments corresponding to a floor at which a call has been registered, this call is appropriated to the exclusive response by car A, when it comes to that floor, as described previously.

Motor 46 started at its maximum speed to move element 23a, but as brush 170, carried by element 23a, moves out of contact with segment 141a, coil SL is deenergized, inserting part of resistor 47 in series with motor armature 46 which, thereupon slows down to its normal predetermined rate which was selected as proportional to the round trip time of the cars of the bank for the traffic conditions to be met, it being adjusted for this rate by manual movement of the connectors 47a to include a sufficient amount of the resistor 47 in the circuit of the motor 46 to control the speed of the motor to the desired rate.

When relay AND became energized, the signal lamp 50 of car A was operated to give a "next" signal to the car operator of that car by circuit:

L1—AND5—50—L2 (Fig. 6)

This signal advises the operator of car A that his car is the next to start (there may be several cars at the dispatching floor) and that he will shortly receive a "start" signal by the operation of lamp 53 (Fig. 6) and to be prepared to start his car.

As shaft 32 continues rotating, a point is reached where switch 36 is closed, energizing coil J L1—36—coil J—L2 (Fig. 6)

Coil ASD then becomes energized

L1—coil ASD—AND1—J1—L2 (Fig. 6)

Coil AND is deenergized by the opening of contact ASD1.

Coil K is deenergized by the opening of contact AND3.

When relay ASD becomes energized, the signal lamp 53 in car A is energized to give a "start" signal to that car by the circuit

L1—ASD4—53—L2

This advises the operator of car A to start downward to answer any calls for service that may have been appropriated to car A storage relays as described previously.

Assume that car B had been coming to the top terminal and that its pick-up selector element B23a arrives at its top position. Relay BUL had been energized to drive this element up and, when it arrives in its top floor position, switch B45 opens, deenergized coil BUL. When back contact BUL2 closes, relay BDL becomes energized L1—BDL—BUL2—B44—L2 (Fig. 6)

Assume shortly after this that car B arrives at the top floor closing switches B21 and B21a with its cam B19. When selector brush 271 engages segment 249a, relay BSL becomes energized by a circuit similar to that described previously for relay SL.

As shaft 32a rotates, cam 39 closes switch 42 and a circuit is set up to energize relay BND L1—BND—BSD1—42—B22—J2—K1—L2 (Fig. 6)

Relay K again becomes energized and BND locks in through its self-holding contact. Car B receives a "next" signal from the signal lamp 52

L1—BND5—51—L2

Later switch 37 closes, energizing relay BAD, which starts motor B46 through circuits similar to those described for car A.

When motor 31 closes switch 36, again energizing relay J, relay BSD becomes energized, giving car B a "start" signal by energizing "start" lamp 54.

Returning now to car A, and assuming that its pick-up selector element 23a arrives at its lowest position, switch 44 is opened and relay ADL becomes deenergized. When contact ADL1 closes, coil AUL becomes energized L1—coil AUL—ADL1—45—L2 (Fig. 6)

and motor 46 is reversed and starts element 23a up

L1—47—47a—AUL3—46—AUL4—AUL5—L2
(Fig. 6)

Car A then arrives at its lower terminal having responded to calls for service that had been assigned to it on the down trip of element 23a. Car A now starts up to give service on the up trip. When element 23a and car A arrive at the top terminal the sequence just described repeats.

By the foregoing description, it is seen that we have provided a pick-up selector for each car which leaves the dispatching floor at a rapid rate ahead of the car but which soon slows down and travels ahead of the car at a selected predetermined rate, regardless of the car starting and stopping and that it picks up and stores or reserves for its car such calls as it finds registered ahead of it; that, if the car tends to catch up to the pick-up selector, that selector will increase its speed; that if the car then slows down, the pick-up selector will return to its selected normal speed; that the pick-up selector will stop when it arrives at the dispatching floor and wait for its car to receive a "next" to start signal.

It will also be apparent that if the pick-up selector of a following car moves into position between the leading car and the pick-up selector of that leading car, it (the pick-up selector of the following car) will pick up any calls ahead of it which may have been registered at floors passed by the pick-up selector of the leading car but not yet passed by the signal selector of the leading car.

Under this arrangement, a passenger who registers a call at a floor being approached by a car behind its normal running schedule, will not cause that car to stop for him. His call will be picked up by the pick-up selector of the next following car. The net result of this will be that a passenger will rarely get an instantaneous response to his stop call but he will never have to wait very long for a call because the calls will be allotted more evenly to the cars and they will therefore be able to answer them more promptly.

In other words, the pick-up selector of each car travels ahead of that car at a normal predetermined speed suitable to the number of cars and their round trip schedule and picks up those calls which are normal to such a normal progress, and the picking up of the calls does not depend upon whether the car is ahead of time, on time or behind time.

The foregoing assumed operation illustrates the operation of this embodiment of our invention. Since certain changes may be made in the foregoing construction and different embodiments of the invention may be made without departing from the scope thereof, it is intended that all matter shown in the accompanying drawings and set forth in the foregoing description shall be interpreted as illustrative and not in a limiting sense.

We claim as our invention:

1. In a control system for operating a plurality of elevators past a plurality of floors; means common to all the cars for registering calls for service at said floors; means associated with each car responsive to said first mentioned means for causing the associated car to stop at the floors where said calls for service originate; mechanism associated with each car comprising a stationary element and a moving element, said moving element moving independently of the movements of the associated car; and means responsive to said mechanism of any car for appropriating calls for service for response exclusively by the associated car.

2. In a control system for operating a plurality of elevators past a plurality of floors at which calls for service cause any of said elevators to stop; a mechanism for each car for appropriating any call for service for the exclusive response of the associated car, said mechanism comprising a moving element moving cooperatively with a stationary element and independently of the movement of its car past the floors; a timing mechanism, and means responsive to an operation of said timing mechanism for causing any of said moving elements to start moving, to thereby appropriate service calls to the associated car.

3. In a control system for operating a plurality of elevators past a plurality of floors at which calls for service may be placed to cause any of said elevators to stop; mechanism associated with each car for appropriating calls for service for the exclusive response of the associated car, said mechanism comprising a stationary element and a moving element cooperating therewith; a timing mechanism responsive to arrival and departure of said elevators from one of said floors for giving starting signals to said cars, indicating when each should start; means responsive to said timing mechanism for causing the moving element associated with a signalled car to start moving prior to the giving of said start signal to said car.

4. In a control system for an elevator operable past a plurality of floors, the combination of means to start said car, a stop control at each floor, means responsive to operated stop controls for partially preparing a circuit to cause stopping of said car at said floor, a call appropriating mechanism comprising an element movable independent of car motion past a plurality of positions, each corresponding to a floor, means associated with each of said floors cooperating with said moving element for completing a prepared circuit to cause said car to stop at the associated floor.

5. In a control system for an elevator operable past a plurality of floors, the combination of mechanism comprising a moving element and a cooperating stationary element, said moving element, movable independent of car motion past a plurality of positions each corresponding to one of said floors; car starting means; a floor control for each of said floors for causing stopping of said car, and means jointly responsive to the operation of a floor control and the movement of said moving element for causing the stopping of said car at said floor.

6. In a control system for an elevator operable past a plurality of floors, the combination of starting mechanism for said car; stopping mechanism for causing slow-down and stopping of said car; a stop control at one of said floors; a first selector mechanism comprising a moving element operable in accordance with car movements; a second mechanism comprising a moving element, movable independent of car motion, and means responsive jointly to said stop control and said first and second movable elements for causing said car to stop at said floor.

7. In a control system for an elevator operable past a plurality of floors, a stop control at each floor, means for causing said car to stop at any of said floors comprising a moving element co-operating with a stationary element, movable in accordance with car movements and moving past a plurality of positions each associated with one of said floors; a second moving element co-operating with a second stationary element and movable at a predetermined speed past a plurality of positions each associated with one of said floors; and means to increase said predetermined speed responsive to cooperation of said first and said second moving elements as they both approach a given floor position.

8. In a control system for an elevator operating past a plurality of floors, means for starting said elevator; a stop control at one of said floors, means for stopping said car at said floor in response to an operation of said control comprising a first stationary element and a first moving element cooperating therewith, and a second stationary element and a second moving element cooperating therewith; said stopping means being responsive to stop said car only in the event that both moving elements move into a predetermined position associated with said floor after said floor control has been operated.

9. In an elevator system for operating a plurality of cars serving a plurality of floors, means common to all the cars for registering stop calls at said floors, a signal selector for each car, means associated with each car for operating its signal selector in advance of and in accordance with its movements, a pick-up selector for each car, means for moving the pick-up selector for each car in advance of the signal selector for that car and at a selected normally constant speed, means responsive to the approach of the pick-up selector to the floor of an operated stop call means for reserving to its car the call registered by the operation of said stop call means, and means responsive to the approach of the signal selector of that car to the floor of the operated stop call means and to the storage of the registered call by the pick-up selector of that car for stopping that car at that floor.

10. In an elevator system for operating a plurality of cars serving a plurality of floors, a stop call registering means common to all the cars for each of the floors, a signal selector for each car, means associated with each car for causing its signal selector to travel in advance of and in accordance with the position of the car, a pick-up selector for each car, means for causing the pick-up selector for each car to travel in advance of the signal selector for that car at a selected predetermined constant speed, means responsive to the signal selector of a car approaching within a predetermined distance of the position of the pick-up selector for that car for causing that pick-up selector to travel at a more rapid rate than its selected predetermined constant speed, means responsive to the approach of the pick-up selector to a floor for which a stop call means has been operated for storing the stop call registered by such operation for the car of that pick-up selector, and means responsive to the approach of the signal selector for that car to the floor of the operated stop call means and to the operation of the pick-up selector for stopping that car at that floor.

11. In an elevator system for operating a plurality of cars serving a plurality of floors, a stop call registering means for each floor, a signal selector for each car, means associated with each car for operating its signal selector in accordance with its movement, a pick-up selector for each car, means for operating each pick-up selector at a selected predetermined constant speed in advance of the signal selector for the car with which it is associated, means for dispatching the cars from a dispatching floor, means responsive to the operation of each pick-up selector for causing it to stop at the dispatching floor, means responsive to operation of the dispatching system in dispatching a car for causing the pick-up selector of that car to leave the dispatching floor ahead of that means responsive to the approach of a pick-up selector to a floor for which a stop call means has been operated for reserving the call registered by such operation to the car with which that pick-up selector is associated, and means responsive to the approach of the floor selector of that car to that floor and to the operation of that pick-up selector in storing the registered call for stopping that car at that floor.

12. In an elevator system for operating a plurality of cars serving a plurality of floors, a stop call registering means for each floor, a signal selector for each car, means associated with each car for operating its signal selector in accordance with its movement, a pick-up selector for each car, means for operating each pick-up selector at a constant speed in advance of the signal selector with which it is associated, means for dispatching the cars from a dispatching floor, means responsive to the arrival of each pick-up selector at the dispatching floor for causing it to stop thereat, means responsive to operation of the dispatching system in dispatching a car for causing the pick-up selector of that car to leave the dispatching floor ahead of that car and at a speed above its constant speed, means responsive to that pick-up selector getting a predetermined distance ahead of its car for causing it to resume its constant speed, means responsive to the approach of a pick-up selector to a floor for which a stop call means has been operated for reserving the call registered by such operation to the car with which that pick-up selector is associated, and means responsive to the approach of the floor selector of that car to that floor and to the operation of that pick-up selector in storing the registered call for stopping the car at that floor.

EDGAR M. BOUTON.
HAROLD W. WILLIAMS.
DANILO SANTINI.